Patented Oct. 18, 1949

2,485,339

UNITED STATES PATENT OFFICE 2,485,339

AQUEOUS FUNGICIDAL DISPERSIONS OF SALICYLANILIDE

Willem van Eijk, Amsterdam, Netherlands, assignor to Nederlandsche Centrale Organisatie Voor Toegepast-Natuurwetenschappelijk Onderzoek, The Hague, Netherlands No Drawing. Application August 10, 1946, Serial No. 689,832. In the Netherlands August 22, 1945

20 Claims. (Cl. 167—30)

The invention relates to a method of preparing a product containing salicylanilide for the purpose of destroying fungi, after diluting it with water. The products prepared according to the invention are particularly important for destroying the "false mildew" on tomatoes and other useful plants, for which purpose they are diluted with water and then sprayed on the plants to be protected. It is a known fact that salicylanilide is an effective fungicide for the protection of textile products and other materials, as plants, seeds, and the like against attacks by fungous organisms, such as mildew. The salicylanilide is here mostly used in the form of a watery suspension.

In order to obtain a sufficiently finely dispersed suspension, the salicylanilide is first dissolved in sodium-lye, whereafter the salicylanilide is liberated again from the formed sodium salt by adding an acid.

Now a simple and cheap way has been found to prepare products containing salicylanilide, wherein the salicylanilide is present in a very finely dispersed form. This is accomplished according to my invention by melting the salicylanilide with a substance having an emulsifying effect which lowers the melting point of the salicylanilide, and then converting it into a watery dispersion containing in addition a substance having a stabilizing effect. The eventual addition of a wetting agent also is generally desired. Preferably the suspension obtained in this manner is then brought to a pH of approximatively 7, which can be effected, for instance, by adding a small quantity of acid, such as hydrochloric acid, if the suspension shows an alkaline reaction.

As substances having an emulsifying effect are to be considered especially alkali salts of sulphonic acids from mineral oil; however, it is possible to use other known emulsifiers which act to lower the melting point of salicylanilide, for instance alkali soaps of higher fatty acids. Preferably an oil soluble sodium sulphonate is used as an emulsifier, as it proved to lower the melting point of the salicylanilide to such an extent that it drops below the boiling point of the water phase, so that it can easily be converted in a colloidmill into a finely dispersed form in an aqueous medium. Besides this, it can be of importance to add a small quantity of a wetting agent, as otherwise the products, after dilution with water, appeared in some cases to have insufficient wetting effect; as wetting agents mono alkyl sulphates or their alkali metal salts may be used with advantage.

In order to obtain dispersions of sufficient stability the presence of a stabilizer in the products according to the invention has been found to be essential. As such are to be considered, for instance, sulphite-lye and certain species of clay. Preferably sulphite-lye (a residual product of the preparation of sulphite-cellulose) is used, as therewith particularly fine dispersions are obtained, in which hardly any coarser particles (i. e. particles with a diameter of more than 25 m$\mu$) are to be found. This latter is of great importance for a homogeneous, even covering of the materials, plants and the like, to be protected, which is essential in order to obtain an effective fungicide action.

When applying sulphite-lye in the suspensions prepared according to the invention, its quantity may not be too large, as it has been found that otherwise the suspensions containing salicylanilide may produce not only a fungicide action, but also a phytocide action, which has to be avoided by the nature of things when applied to plants. In general the sulphite-lye, calculated on a dry base, should not constitute more than about 10%, and preferably is less than 5% of the total quantity of the undiluted suspension.

The use of clay—for which may be used ordinary clay or special colloidal species of clay, such as bentonite, similar European species of highly hydrophilic swellable clay and the like—has the advantage that the obtained suspension, after diluting with hard water, does not coagulate at all, or very little, and that a suspension which has somewhat settled, can easily be homogenized again by means of shaking or stirring. Relatively small additions of clay, for instance of 5% calculated on the undiluted suspensions, are sufficient. If required, both sulphite-lye and clay can be applied for the preparation of the suspensions.

The method according to this invention not only has the advantage of being more simple than the one where the salicylanilide is first dissolved in the lye and then precipitated with acid, but moreover the corrosion difficulties encountered in the preparation of the suspension, when using lye and acid, are avoided. In consequence of their exceedingly high degree of dispersion, the products prepared according to this invention have an extraordinary effectiveness, while at the same time they have a high stability and do not or practically do not foam upon diluting them with water.

If required, the rainproofness of the obtained products can be raised by adding a small quantity, for instance a few percent., of gelatin or chromium gelatin.

Although the products prepared according to the invention are suitable for destroying fungi in general, they proved to be of particularly great importance for the destruction of "false mildew" on tomatoes and other useful plants, for instance cucumbers. They also can be used with success for the prevention of mold growth on textile materials.

The materials to be protected against mold growth can be treated with the fungicide products prepared according to this invention in any suitable manner, for instance by spraying or soaking. When applying to plants, these are effectively sprayed with the watery fungicide suspensions.

*Example*

A mixture of 10.5 parts by weight of salicylanilide and 10.5 parts by weight of sodium salts of sulphonic acids from spindle-oil with a molecular weight of 200-300, was melted and heated (to about 140° C.) and thereupon dispersed in a colloidmill with 34.7 parts by weight of sulphite-lye (dry base per cent. 4.7) of 60-70° C.

After cooling, 49.55 parts by weight of a clay suspension were added to the dispersion obtained in this way; this clay suspension was prepared by suspending in water 5.25 parts by weight of a commercial swellable colloidal clay, under addition of a Na salt of secondary alkylsulphate containing from 10 to 18 carbon atoms in the molecule, in order to prevent coagulation of the suspension when diluting with hard water and to facilitate the rehomogenization of the suspension when this has dehomogenized somewhat in storage. The obtained suspension was then brought to a pH=7.1 by addition of 1.7 parts by weight of 2.2 n hydrochloric acid.

The product thus obtained was very finely dispersed and even after standing for a considerable time showed very little settling. When applying the product, diluted with 75-100 times its quantity of water, as a spray on tomato plants, the fungicide action was found to be very good with regard to the fungus known as "false mildew" (*Cladosporium fulvum*), while the spraying was harmless for the crops.

I claim:

1. A method of preparing an aqueous fungicidal dispersion containing salicylanilide in very finely dispersed form, which comprises melting salicylanilide with an emulsifying agent that lowers the melting point of the salicylanilide to obtain a molten composition miscible with water in liquid phase, and then thoroughly dispersing said composition in molten state in an aqueous liquid medium at a temperature below the melting point of salicylanilide.

2. A method as described in claim 1, said emulsifying agent being an alkali metal salt of soap-forming fatty acid.

3. A method as described in claim 1, said emulsifying agent being an oil-soluble alkali metal sulphonate.

4. A method as described in claim 1, said emulsifying agent being an oil-soluble sodium salt of mineral oil sulphonic acid.

5. A method of preparing a stable aqueous fungicidal dispersion containing salicylanilide in very finely dispersed form, which comprises melting salicylanilide with an emulsifying agent that lowers the melting point of the salicylanilide to obtain a molten composition miscible with water in liquid phase, and then thoroughly dispersing said composition in molten state in an aqueous liquid medium containing sulphite-lye at a temperature below the melting point of salicylanilide.

6. A method as described in claim 5, the sulphite-lye being present in an effective amount not exceeding 10% of the weight of the dispersion on a dry basis.

7. A method as described in claim 5, and incorporating a colloidal clay in the dispersion.

8. A method as described in claim 5, and incorporating in the dispersion a substance from the group consisting of mono-alkyl sulphates and their alkali metal salts to enhance the wetting power of the dispersion for plants.

9. A method as described in claim 5, and incorporating a gelatine in the dispersion to enhance its rainproofness.

10. A method of preparing a stable aqueous suspension of salicylanilide in very finely dispersed form, which upon dilution with water is an effective fungicide particularly for "false mildew," which method comprises melting salicylanilide with an alkali metal sulphonate so as to obtain a molten composition miscible with water in liquid phase, and then thoroughly dispersing said composition in molten state in a heated aqueous liquid medium at a temperature below the melting point of salicylanilide, said medium containing sulphite-lye in an amount less than 5% of the weight of the dispersion on a dry basis.

11. A method of preparing a stable aqueous suspension of salicylanilide in very finely dispersed form, which upon dilution with water is an effective fungicide particularly for "false mildew," which method comprises melting salicylanilide with an alkali metal salt of mineral oil sulphonic acid so as to obtain a molten composition miscible with water in liquid phase, then dispersing said composition in molten state in a heated aqueous liquid medium containing sulphite-lye at a temperature below the melting point of salicylanilide, allowing the dispersion to cool, and then incorporating a colloidal clay therein, the amount of sulphite-lye being less than 5% of the weight of the product on a dry basis.

12. A method as described in claim 11, and adjusting the pH of the product to approximate neutrality.

13. A method as described in claim 11, the colloidal clay being incorporated in the form of an aqueous suspension of such clay.

14. A method as described in claim 13, said aqueous clay suspension containing an alkali metal salt of a higher molecular alkyl sulphate to enhance the wetting power of the product for plants.

15. A fungicidal preparation comprising an aqueous liquid medium having salicylanilide stably suspended therein in the form of very finely dispersed and solidified particles of a product of fusion of the salicylanilide with an emulsifying agent that reduces its melting point, said particles having an average size not exceeding about 25 millimicrons in diameter.

16. A fungicidal preparation comprising an aqueous liquid medium containing sulphite-lye and having salicylanilide stably suspended therein in the form of very finely dispersed and solidified particles of a product of fusion of the salicylanilide with an emulsifying agent that reduces its melting point, substantially all of said particles being of a size not exceeding about 25 millimicrons in diameter.

17. A fungicidal preparation comprising an aqueous liquid medium having stably suspended therein water-insoluble salicylanilide in the form of very finely dispersed and solidified particles of a product of fusion of the salicylanilide with an oil-soluble alkali metal sulphonate, said particles having an average size not exceeding about 25 millimicrons in diameter.

18. A fungicidal preparation comprising an aqueous liquid medium having stably suspended therein water-insoluble salicylanilide in the form of very finely dispersed and solidified particles of a product of fusion of the salicylanilide with an alkali metal salt of soap-forming fatty acid, said particles having an average size not exceeding about 25 millimicrons in diameter.

19. A fungicidal preparation comprising an aqueous liquid medium containing sulphite-lye in an amount less than 5% of the weight of the preparation on a dry basis, having water-insoluble salicylanilide stably suspended therein in the form of very finely dispersed and solidified particles of a product of fusion of the salicylanilide with an oil-soluble alkali metal salt of mineral oil sulphonic acid, and containing suspended colloidal clay, substantially all of said particles being of a size not exceeding about 25 millimicrons in diameter.

20. A fungicidal preparation comprising an aqueous liquid medium containing sulphite-lye in an amount less than 5% of the weight of the preparation on a dry basis, having water-insoluble salicylanilide stably suspended therein in the form of very finely dispersed and solidified particles of a product of fusion of the salicylanilide with an oil-soluble alkali metal salt of mineral oil sulphonic acid, and containing suspended colloidal clay and a small amount of an alkali metal salt of a higher molecular alkyl sulphate, substantially all of said particles being of a size not exceeding about 25 millimicrons in diameter.

WILLEM VAN EIJK.

REFERENCES CITED

The following references are of record in the file of this patent:

UNITED STATES PATENTS

| Number | Name | Date |
|---|---|---|
| 1,496,279 | Shibata | June 3, 1924 |
| 2,101,704 | Dangelmajer | Dec. 7, 1937 |
| 2,136,868 | Schotte | Nov. 15, 1938 |
| 2,146,739 | Heath | Feb. 14, 1939 |
| 2,169,240 | Heath et al. | Aug. 15, 1939 |
| 2,416,460 | Smith et al. | Feb. 25, 1947 |
| 2,423,457 | Lynn et al. | July 8, 1947 |

FOREIGN PATENTS

| Number | Country | Date |
|---|---|---|
| 528,054 | Great Britain | Oct. 22, 1940 |